(12) United States Patent
Garcia et al.

(10) Patent No.: US 12,275,835 B1
(45) Date of Patent: Apr. 15, 2025

(54) HIGH CLARITY ANTIMICROBIAL RESINS

(71) Applicant: Phoenix Plastics L.P., Conroe, TX (US)

(72) Inventors: Anthony Fabro Garcia, Montgomery, TX (US); Rodrigo Alvarez Garcia, Montogmery, TX (US)

(73) Assignee: Phoenix Plastics L.P., Conroe, TX (US)

( * ) Notice: Subject to any disclaimer, the term of this patent is extended or adjusted under 35 U.S.C. 154(b) by 940 days.

(21) Appl. No.: 17/335,461

(22) Filed: Jun. 1, 2021

Related U.S. Application Data

(60) Provisional application No. 63/125,162, filed on Dec. 14, 2020, provisional application No. 63/102,112, filed on Jun. 1, 2020.

(51) Int. Cl.
C08K 5/31 (2006.01)
A01N 25/10 (2006.01)
A01N 47/44 (2006.01)
A01P 1/00 (2006.01)
C08J 3/22 (2006.01)

(52) U.S. Cl.
CPC ............... C08K 5/31 (2013.01); A01N 25/10 (2013.01); A01N 47/44 (2013.01); A01P 1/00 (2021.08); C08J 3/226 (2013.01)

(58) Field of Classification Search
USPC .......................................... 523/122
See application file for complete search history.

(56) References Cited

U.S. PATENT DOCUMENTS

2015/0366188 A1* 12/2015 Adam ...................... C08F 8/30
                                                       523/351
2018/0244895 A1*  8/2018 Iyigundogdu .......... A01N 55/02
2021/0307330 A1* 10/2021 Grage, Jr. ................ C02F 1/76

* cited by examiner

Primary Examiner — Fred M Teskin
(74) Attorney, Agent, or Firm — Bradley Arant Boult Cummings LLP

(57) ABSTRACT

Resins with antimicrobial properties and molded articles including the same. In particular, the resins of the invention possess low haze, high light transmission, and/or a refractive index of 1.7 or less and antimicrobial properties.

20 Claims, 1 Drawing Sheet

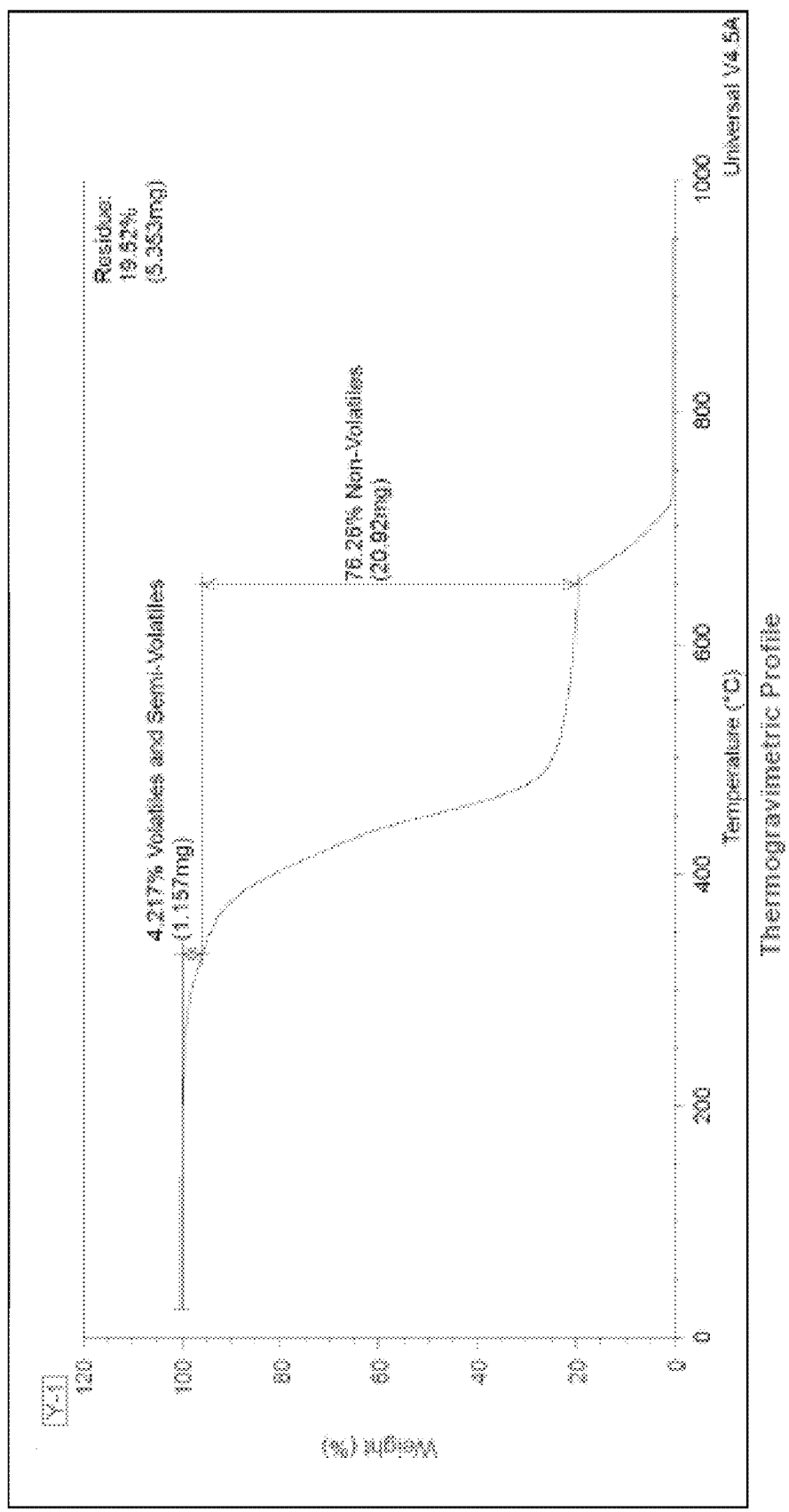

HIGH CLARITY ANTIMICROBIAL RESINS

FIELD OF THE INVENTION

The present invention generally relates to resins with antimicrobial properties and molded articles including the same. In particular, the resins of the invention possess high clarity and anti-microbial properties. More specifically, the resins, which include a base resin and an antimicrobial additive, have low haze, high light transmission, and/or a refractive index of 1.7 or less.

BACKGROUND OF THE INVENTION

Since thermoplastic resins exhibit good moldability and impact resistance, they are used in a variety of applications including building materials, automotive materials, and electrical and electronic products. More specifically, polyester resins are known to have high mechanical strength and good moldability. Polycarbonate resin has good thermal resistance, impact resistance, and dimensional stability. Poly(ethyleneterephthalate) (PET) and glycol modified PET (PETG) typically have good chemical resistance. In addition, there are usually active recycling programs for PET and PETG.

Recent focus on such materials also having microbial properties has resulted in the use of two categories of microbial additives. The first category includes metals such as silver, copper ions, or zinc pyrrthione and the use of such additives (and any carriers used) imparts color, haze, or opacity. For example, at temperatures just above 400° F., zinc degrades, which causes a harsh yellowing of the material. The second category includes quaternary amines or acids, which have decomposition temperatures that prevent use with certain base resins that require a much higher temperature for processing.

It would be advantageous to obtain a resin with favorable clarity and impact characteristics and antimicrobial properties. Accordingly, there remains a need in the art to develop novel antimicrobial resins with high clarity and good impact resistance that can be used in a variety of applications. Moreover, it would be advantageous to obtain a resin with favorable clarity, good impact resistance, and antimicrobial properties that is recyclable.

SUMMARY OF THE INVENTION

The present invention is directed to a resin composition including a base resin including polycarbonate and an additive having a decomposition temperature of about 450° F. or greater, wherein the additive is effective against Gram-positive bacteria and Gram-negative bacteria. In one embodiment the base resin and the resin composition have a refractive index of about 1.4 to about 1.6. The resin composition may be bacteriostatic, bactericidal, or both.

In another embodiment, the base resin and the resin composition have a refractive index of about 1.5 to about 1.6. In still another embodiment, the additive has a decomposition temperature of about 490° F. to about 550° F. In yet another embodiment, the additive can kill about 95 percent or more of Gram-positive and Gram-negative bacteria within 1 minute or less. For example, in one aspect, the additive can kill about 99 percent or more of Gram-positive and Gram-negative bacteria within 30 seconds or less. In still another embodiment, the difference between the refractive index of the base resin and the resin composition is less than about 0.1. In yet another embodiment, the resin composition also includes at least one additional component selected from the group consisting of a heat stabilizer, an antioxidant, a UV stabilizer, and mixtures thereof.

In this aspect, the base resin may be included in an amount of about 80 to about 98 weight percent, the antimicrobial additive may be included in an amount of about 1 to about 20 weight percent, and the additional component may be included in an amount of about 0.5 to about 3 weight percent of based on the total weight of the resin composition. In one embodiment, the additional component is included in an amount of about 1 to about 5 weight percent based on the total weight of the resin composition.

The present invention is also directed to a resin composition including a base resin comprising polycarbonate, polypropylene, poly(ethyleneterephthalate), glycol modified poly(ethyleneterephthalate), or glycol modified poly-cyclohexylenedimethylene terephthalate and an additive having a decomposition temperature of about 500° F. or greater, wherein the additive is effective against Gram-positive bacteria, Gram-negative bacteria, fungi, or combinations thereof. The base resin and the resin composition may have a light transmission of at least about 88 percent. The resin composition may be bacteriostatic, bactericidal, or both.

In one embodiment, the base resin includes a biaxially oriented polypropylene. In another embodiment, the base resin includes branched chain polycarbonate. In yet another embodiment, the resin composition has a haze of about 1 percent or less. In still another embodiment, the difference between the light transmission of the base resin and the resin composition is about 2 percent or less. In yet another embodiment, the difference between the light transmission of the base resin and the resin composition is about 1 percent or less.

In this aspect, the resin composition may include at least one additional component selected from the group consisting of a heat stabilizer, an antioxidant, a UV stabilizer, and mixtures thereof. In one embodiment, the additional component is included in an amount of about 1 to about 5 weight percent based on the total weight of the resin composition. In another embodiment, the base resin may be included in an amount of about 70 to about 98 weight percent, the antimicrobial additive may be included in an amount of about 1 to about 20 weight percent, and the additional component may be included in an amount of about 0.5 to about 3 weight percent of based on the total weight of the resin composition.

The present invention is also directed to a method of making an antimicrobial resin composition including: providing a base resin including polycarbonate, polypropylene, poly(ethyleneterephthalate), glycol modified poly(ethyleneterephthalate), or glycol modified poly-cyclohexylenedimethylene terephthalate, and wherein the base resin has a porosity of about 30 percent to about 90 percent; adding an alcohol to the base resin for a predetermined period of time to produce a dry base resin; and adding an antimicrobial additive to the dry base resin at a maximum loading time of an hour or less to form antimicrobial impregnated pellets, wherein the antimicrobial impregnated pellets are effective against Gram-positive bacteria, Gram-negative bacteria, fungi, or combinations thereof, and wherein the base resin and the antimicrobial impregnated pellets have a light transmission of at least about 88 percent.

The present invention also relates to a masterbatch including about 80 to about 98 weight percent polycarbonate based on the total weight of the masterbatch; about 1 to about 20 weight percent of an additive effective against Gram-positive bacteria and Gram-negative bacteria based on the total weight of the masterbatch; and about 0.5 to about 5 weight percent of at least one additional component selected from the group consisting of a heat stabilizer, an antioxidant, a UV stabilizer, and combinations thereof. In one embodiment, the additive is chlorhexidine or a derivative thereof. In another embodiment, the additive is present in an amount of about 2 to about 15 weight percent based on the total weight of the masterbatch. In this aspect, the polycarbonate is present in an amount of about 90 to about 97 weight percent based on the total weight of the masterbatch. In one embodiment, the at least one additional component is present in an amount of about 1 to about 3 weight percent based on the total weight of the masterbatch. In another embodiment, the masterbatch is both bacteriostatic and bactericidal.

BRIEF DESCRIPTION OF THE DRAWINGS

The following drawings are attached to—and form a portion of—this disclosure:

FIG. 1 is a graph showing the results of thermogravimetric analysis of a composition formed according to an embodiment of the invention.

DETAILED DESCRIPTION OF THE INVENTION

The present invention is directed to high clarity resin compositions with antimicrobial properties. More specifically, the resin compositions of the present invention include at least one base resin and at least one antimicrobial additive. The base resin has a high clarity, as defined by refractive index, haze, light transmission, or a combination thereof. The antimicrobial additive has a high decomposition temperature and is effective against Gram-positive bacteria, Gram-negative bacteria, and/or fungi.

Base Resin

Without being bound by any particular theory, using a high clarity base resin, as defined by its refractive index, light transmission, haze, or a combination thereof, with an antimicrobial additive that will not interfere with the clarity of the base resin will provide a high clarity resultant resin with antimicrobial properties. In addition, such a base resin preferably has good impact resistance, good chemical resistance, or a combination thereof. Moreover, the base resin may be recyclable.

In this regard, the base resin may have a refractive index of about 1.7 or less (as measured in accordance with ASTM D542). In particular, a refractometer, such as the Abbe refractometer, may be used to measure the refractive index of the base resins and resultant resins of the present invention using the critical angle effect. The test sample should have at least one flat polished surface and can be any size that can sit on the refractometer prism. As would be understood by those of ordinary skill in the art, the refractive index (n) of a material, which is a value calculated from the ratio of the speed of light in a vacuum to that in a second medium of greater density, is indicative of how the speed of light changes when it passes through a material. In one embodiment, the refractive index of the base resin is about 1.65 or less. In another embodiment, the refractive index is about 1.6 or less. In yet another embodiment, the refractive index is about 1.4 to about 1.6. For example, the base resin may have a refractive index of about 1.5 to about 16.

When measured in accordance with ASTM D1003, the base resin may have light transmission of about 80 percent to about 100 percent. In one embodiment, the base resin has a light transmission of about 82 percent to about 100 percent. In another embodiment, the base resin has a light transmission of about 85 percent to about 100 percent. In still another embodiment, the base resin has a light transmission of at least about 88 percent. For example, the light transmission of the base resin may be about 88 percent to about 92 percent.

The clarity of the base resin may also be defined by the haze (as measured in accordance with ASTM D1003). In one embodiment, the base resin has a haze of about 2 percent or less. In another embodiment, the haze of the base resin is about 1.5 percent or less. In yet another embodiment, the base resin has a haze of about 1 percent of less. For example, the haze of the base resin may be about 0.8 percent or less.

The izod impact of the base resin may be from about 1 to about 1200 J/m when measured in accordance with ASTM D 256 (i.e., the izod impact, notched, 23° C.) or from about 10 to about 200 kJ/m$^2$ when measured in accordance with ISO 180/1A. In one embodiment, the izod impact of the base resin is about 500 to about 1100 J/m when measured in accordance with ASTM D 256 and/or about 20 to about 100 kJ/m$^2$ when measured in accordance with ISO 180/1A. The Charpy impact (notched, 23° C.) measured in accordance with ISO 179 may range from 2 to 50 kJ/m$^2$.

The tensile strength of the base resin may be from about 45 to about 75 MPa (about 7000 to about 11,000 psi) when measured in accordance with ASTM D 638. In one embodiment, the tensile strength is about 55 to about 68 MPa (about 8000 to about 10000 psi) when measured in accordance with ASTM D 638.

The flexural strength of the base resin may range from about 60 to about 140 MPa (about 9000 psi to about 20,000 psi) when measured in accordance with ASTM D 790. In one embodiment, the flexural strength of the base resin ranges from about 80 to about 100 MPa when measured in accordance with ASTM D 790.

The flexural modulus of the base resin may range from about 2000 to about 3000 MPa when measured in accordance with ASTM D 790. In one embodiment, the flexural modulus of the base resin may range from about 2100 MPa to about 2400 MPa when measured in accordance with ASTM D 790. In another embodiment, the flexural modulus of the base resin ranges from about 2200 to about 2375 MPa (ASTM D 790).

The heat deflection temperature (HDT) of the base resin, which is a measure of the resin's resistance to distortion under a given load at elevated temperature, may range from about 200° F. to about 300° F. when measured in accordance with ASTM D 648 (at 66 or 264 psi). In one embodiment, the HDT of the base resin ranges from about 225° F. to about 290° F. when measured in accordance with ASTM D 648 (at 66 or 264 psi).

The vicat softening temperature may range from about 200° F. to about 350° F. when measured in accordance with ASTM D 1525. In one embodiment, the vicat softening temperature may range from about 250° F. to about 310° F. when measured in accordance with ASTM D 1525.

The melt flow rate of the base resin may be from about 2 to about 15 g/10 min (measured in accordance with ASTM D 1238). For example, the melt flow rate of the base resin may be about 8 to about 12 g/10 min (measured in accordance with ASTM D 1238). In another embodiment, the base resin has a melt flow rate of about 3 to about 8 g/10 min (measured in accordance with ASTM D 1238). In still another embodiment, the base resin has a melt flow rate of about 3 to about 11 g/10 min (measured in accordance with ASTM D 1238).

The base resin may be selected from a number of different types of resin provided that it meets the clarity, impact resistance, and at least some of the other properties detailed above. Indeed, as would be appreciated by a person of ordinary skill in the art, the selection of a particular base resin depends on the material properties and ultimate end use, as well as other factors.

In one embodiment, the base resin may be a polycarbonate resin. In one embodiment, the polycarbonate resin is a linear aliphatic polycarbonate. In another embodiment, the polycarbonate resin may be an aromatic polycarbonate resin prepared by reacting one or more diphenols (for example, aromatic diol compounds) with a precursor, such as phosgene, halogen formate, and carbonic diester. Suitable diphenols include, but are not limited to, 4,4'-biphenol, 2,2-bis (4-hydroxyphenyl)propane (bisphenol A), 2,4-bis(4-hydroxyphenyl)-2-methylbutane, 1,1-bis(4-hydroxyphenyl) cyclohexane, 2,2-bis(3-methyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, and the like, and mixtures thereof.

In still another embodiment, the polycarbonate resin is a branched chain polycarbonate resin. In one embodiment, such a resin may be prepared by adding a tri- or higher polyfunctional compound, for example, a tri- or higher valent phenol group-containing compound, in an amount of about 0.05 mol % to about 2 mol % based on the total number of moles of the diphenols used in polymerization.

In yet another embodiment, the polycarbonate resin may be a homopolycarbonate resin, a copolycarbonate resin, or a blend thereof. In still another embodiment, the polycarbonate resin may be partly or completely replaced by an aromatic polyester-carbonate resin obtained through polymerization in the presence of an ester precursor, for example, a bifunctional carboxylic acid.

The polycarbonate resin may have a weight average molecular weight (Mw) of about 20,000 g/mol to about 100,000 g/mol. In one embodiment, the Mw of the polycarbonate is about 20,000 g/mol to about 80,000 g/mol, about 20,000 g/mol to about 60,000 g/mol, or about 20,000 g/mol to about 40,000 g/mol, as measured by gel permeation chromatography (GPC). In one embodiment, the base resin may be a blend of at least two kinds of polycarbonate resins having different weight average molecular weights.

In another embodiment, the base resin is porous polymer carrier based on polycarbonate. In this aspect, the polycarbonate carrier resin has an open cell structure with interconnected cells. In particular, the cell size distribution may be between about 15 m and 85 m. In one embodiment, the cell size distribution is between about 20 m and 80 m. In addition, the porosity may range from about 30 percent to about 90 percent. In one embodiment, the porosity ranges from about 35 percent to about 85 percent. Without being bound to any particular theory, the use of such a porous carrier resin allows the antimicrobial additive to be physically absorbed into the porous structure of the carrier resin. In this aspect, the maximum additive loading may range from about 20 percent to about 75 percent. In another embodiment, the maximum additive loading ranges from about 25 percent to about 70 percent.

Nonlimiting examples of commercially available polycarbonates for use as a base resin in accordance with the invention include LEXAN from Sabic and ACCUREL® from Evonik.

The base resin may also be polypropylene. In one embodiment, the polypropylene is random copolymer having a melt flow rate of about 2 to about 15 g/10 min (measured in accordance with ASTMD1238). In another embodiment, the polypropylene has a melt flow rate of about 8 to about 12 g/10 min (measured in accordance with ASTMD1238). In yet another embodiment, the polypropylene has a melt flow rate of about 5 to about 11 g/10 min (measured in accordance with ASTMD1238). The polypropylene may contain anti-blocking additives.

In this aspect, the base resin may be a biaxially oriented polypropylene. Such base resins may be produced using a variety of methods including, but not limited to, BOPP and the tubular process. For example, the base resin may be produced by stretching a biaxially oriented polypropylene film in both machine and transverse directions to obtain molecular chain orientation in two directions. A commercial example of such a base resin is.

In another embodiment, the polypropylene is a porous carrier resin that allows the antimicrobial additive to be absorbed into the carrier resin. In this aspect, the polypropylene carrier resin has an open cell structure with interconnected cells. In particular, the cell size distribution may be between about 15 and 85 µm, or 20 µm and 80 µm. The porosity may range from about 30 percent to about 90 percent or about 35 percent to about 85 percent. In one embodiment, the maximum additive loading may range from about 20 percent to about 75 percent. In another embodiment, the maximum additive loading ranges from about 25 percent to about 70 percent.

Commercially suitable polypropylene resins for use with the present invention include those offered by LyondellBasell under the tradename Clyrell RC213M and those offered from Evonik under the tradename ACCUREL®.

Poly(ethyleneterephthalate) (PET) may also be used as the base resin. In one embodiment, the PET may be glycol modified (PETG). The base resin may also be poly-cyclohexylenedimethylene terephthalate glycol modified (PCTG). In particular, PCTG may be more suitable for use as the base resin as compared to polycarbonate because it does not include bisphenol A (BPA).

In another embodiment, the base resin is porous polymer carrier based on PET. In this aspect, the PET carrier resin has an open cell structure with interconnected cells. In particular, the cell size distribution may be between about 15 µm and 85 µm. In one embodiment, the cell size distribution is between about 20 µm and 80 µm. In addition, the porosity may range from about 30 percent to about 90 percent. In one embodiment, the porosity ranges from about 35 percent to about 85 percent. The maximum additive loading may range from about 20 percent to about 75 percent. In another embodiment, the maximum additive loading ranges from about 25 percent to about 70 percent.

PET, PETG, and PCTG are generally resistant to a plethora of chemicals including, for example, alkyl alcohols, hydrochloric acid, ammonia, hydrogen peroxide, toluene, bleaching solutions, and more. Without being bound by any particular theory, such chemical resistance allows the use of such a base resin in compositions that will ultimately be used for articles that could be wiped down, sprayed, or otherwise cleaned with a number of harsh detergents and the like because such cleaning will not produce a cloudy appearance as it would with other base resins. In addition, PET and derivatives thereof are typically recyclable. Thus, use of PET, PETG, or PCTG as the base resin imparts high clarity and impact resistance, while also providing chemical resistance and recyclability.

Commercial examples of such resins include PET, PETG, and PCTG offered under the brand names SKYGREEN®, SKYPET®, and ECOZEN® from SK Chemicals and ACCUREL© from Evonik.

The base resin may also styrene acrylonitrile resin (SAN), an acrylic resin (such as polyhydroxyethylmethacrylate), acrylonitrile styrene acrylate (ASA), styrene-butadiene copolymer (such as K-resin® from Ineos Styrolution), crystal-clear polystyrene, and combinations thereof. The base resin may be present in the resin compositions of the invention in an amount of about 99.5 percent to about 50 percent by weight (based on the total weight of the resin composition). In another embodiment, the base resin is included in the resin composition in an amount of 99 percent to about 55 percent by weight (based on the total weight of the resin composition). For example, the resin composition may include about 90 percent to about 99 percent by weight of the base resin (based on the total weight of the resin composition). In yet another embodiment, the resin composition includes about 70 percent to about 98 percent by weight of the base resin (based on the total weight of the resin composition). For example, the base resin may be included in the resin composition in an amount of about 92 percent to about 98 percent by weight (based on the total weight of the resin composition).

More than one base resin may be included in the resin compositions of the invention. For example, the base resin may include more than one polycarbonate provided such polycarbonates meet the clarity and impact resistance properties discussed above. In another embodiment, the base resin may include more than one polypropylene provided such polypropylenes meet the clarity and impact resistance properties discussed above. In yet another embodiment, the base resin may include more than one PET, PETG, or PCTG provided such base resins meet the clarity and impact resistance properties discussed above. In still another embodiment, the base resin is composed of more than one type of base resin, i.e., a biaxially oriented polypropylene and PET, a polycarbonate and PCTG, and the like. In this aspect, the base resin may include any amount of the different base resins that preserve the clarity, impact, and, if applicable, chemical resistance, discussed above. In one embodiment, the base resin includes about 60 percent to about 90 percent by weight of a first base resin and the remainder of a second base resin (based on the total weight of the base resin). In another embodiment, the first base resin is included in an amount of about 60 percent to about 80 percent by weight and the second base resin is included in an amount of 20 percent to about 40 percent based on the total weight of the base resin.

Antimicrobial Additive

The antimicrobial additive for use in accordance with the present invention is selected such that it does not alter the clarity of the base resin, but still conveys certain antimicrobial properties such as antibacterial and antifungal properties. Without being bound by any particular theory, while known additives like silver and zinc (and carriers like calcium carbonate and silica) could be used in attempt to convey antibacterial properties to plastic, these prior art additives are not thermally stable at high processing temperatures and, thus, use of these additives would interfere with the refractive index of a high clarity base resin such that the resulting resin would have a cloudy appearance. Indeed, these known additives would essentially burn at the processing temperatures causing degradation and yellowing of the compositions. In contrast, the antimicrobial additives discussed herein are more thermally stable than known antimicrobial additives at temperatures at least about 80° F. or higher and, as such, the resulting resin compositions of the present invention possess the high clarity of the base resin, the antimicrobial properties of the additive, and good impact resistance.

In this aspect, suitable antimicrobial additives in accordance with the present invention may be effective against Gram-positive bacteria, Gram-negative bacteria, and/or fungi. In this aspect, the antimicrobial additive for use with the resin composition preferably inactivate microorganisms with a broader spectrum than antibiotics. Suitable antimicrobial additives are preferably both bacteriostatic (inhibits bacterial growth) and bactericidal (kills bacteria). In this aspect, the antimicrobial additive for use with the resin composition preferably has an improved kill rate over that of povidone-iodine. For example, a suitable antimicrobial additive can kill about 95 percent or more of Gram-positive and Gram-negative bacteria within a minute or less. In one embodiment, the antimicrobial additive can kill about 98 percent or more of Gram-positive and Gram-negative bacteria within 45 seconds or less. In another embodiment, the antimicrobial additive can kill about 99 percent or more of Gram-positive and Gram-negative bacteria within 30 seconds or less.

The antimicrobial additive has a decomposition temperature of about 425° F. or higher. In one embodiment, the antimicrobial additive has a decomposition temperature of about 450° F. or higher. In one embodiment, the antimicrobial additive has a decomposition temperature of at least about 475° F. In yet another embodiment, the antimicrobial additive has a decomposition temperature of about 490° F. to about 550° F. In still another embodiment, the decomposition temperature of the antimicrobial additive is about 495° F. to about 515° F. In yet another embodiment, the antimicrobial additive has a decomposition temperature of about 500° F. or higher.

The molecular weight of the antimicrobial additive may range from about 500 g/mol to about 1000 g/mol. In one embodiment, the antimicrobial additive has a molecular weight of about 600 g/mol to about 950 g/mol. In another embodiment, the molecular weight of the antimicrobial additive is about 625 g/mol to about 900 g/mol.

A suitable antimicrobial additive in accordance with the present invention is chlorhexidine and derivatives thereof. In accordance with the desired antimicrobial properties of the antimicrobial additives for use with the present invention, chlorhexidine can kill nearly 100 percent of Gram-positive and Gram-negative bacteria within 30 seconds by disrupting the cell membrane and, thus, incorporating such a microbial additive in a resin composition of the invention protects against microbial colonization and subsequent biofilm development.

Without being bound by any particular theory, the structure of chlorhexidine, which is shown below in Formula 1, makes it highly compatible with the base resins discussed above.

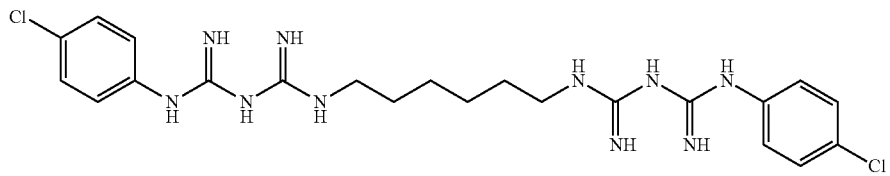 [SMILES: N=C(NCCCCCCNC(=N)NC(=N)Nc1ccc(Cl)cc1)NC(=N)Nc1ccc(Cl)cc1]

More specifically, the structure allows for highly uniform dispersion of the antimicrobial additive in the base resins discussed above. Indeed, the chlorhexidine's dispersibility in the base resin is evident from the lack of blooming in the resin composition.

In one embodiment, the antimicrobial additive is a gluconate salt of chlorhexidine. In particular, the antimicrobial additive may be chlorhexidine gluconate. In another embodiment, the antimicrobial additive is chlorhexidine acetate.

The antimicrobial additive may be present in the resin compositions of the invention in an amount of about 0.5 percent to about 50 percent by weight (based on the total weight of the resin composition). In another embodiment, the antimicrobial additive is included in the resin composition in an amount of 0.5 percent to about 35 percent by weight (based on the total weight of the resin composition). In still another embodiment, the antimicrobial additive is included in the resin composition in an amount of 1 percent to about 20 percent by weight (based on the total weight of the resin composition). For example, the resin composition may include about 5 percent to about 15 percent by weight of the antimicrobial additive (based on the total weight of the resin composition). In yet another embodiment, the resin composition includes about 2 percent to about 12 percent by weight of the antimicrobial additive (based on the total weight of the resin composition). For example, the antimicrobial additive may be included in the resin composition in an amount of about 5 percent to about 10 percent by weight (based on the total weight of the resin composition).

In this aspect, the resin composition may include about 70 percent to about 98 percent by weight of the base resin and about 1 percent to about 10 percent by weight of the antimicrobial additive based on the total weight of the resin composition. In one embodiment, the resin composition includes about 90 percent to about 98 percent by weight of the base resin and about 1 percent to about 5 percent by weight of the antimicrobial additive based on the total weight of the resin composition. In another embodiment, the resin composition includes about 92 percent to about 98 percent by weight of the base resin and about 1 percent to about 3 percent by weight of the antimicrobial additive based on the total weight of the resin composition.

Other Additives

The resin compositions of the present invention may also include at least one or more additional components. Non-limiting examples include thermal/heat stabilizers, antioxidants, release agents, dispersing agents, photostabilizers, dyes, inorganic additives, surfactants, coupling agents, plasticizers, admixtures, lubricants, antistatic agents, pigments, toners, flame retardants, colorants, UV stabilizers, UV absorbers, UV blocking agents, fillers, nucleating agents, adhesive aids, adhesives, and the like, and mixtures thereof. In one embodiment, the additional component may include a thermal/heat stabilizer, an antioxidant, a UV stabilizer, or a mixture thereof. In another embodiment, the additional component(s) includes at least a primary or secondary antioxidant. In this respect, one or more primary antioxidants may be included in the resin composition to help protect to the molded article, one or more secondary antioxidants may be included in the resin composition to stabilize the resin during processing, or both. In one embodiment, an antioxidant masterbatch is included in the resin composition.

The amount of the additional component may be determined depending upon purposes of the thermoplastic resin composition so as not to deteriorate the desired properties thereof. In this aspect, when included, at least one additional component may be present in an amount of about 0.25 percent to about 10 percent by weight of the resin composition. In one embodiment, the resin composition includes about 1 percent to about 5 percent by weight of an additional component based on the total weight of the resin composition. In another embodiment, an additional component is present in an amount of 1 percent to about 4 percent by weight based on the total weight of the resin composition. In still another embodiment, the resin composition includes about 1 percent to about 5 percent by weight of a first additional component and about 1 percent to about 5 percent by weight of a second additional component based on the total weight of the resin composition. In yet another embodiment, the resin composition includes about 1 percent to about 3 percent by weight of a first additional component and about 1 percent to about 3 percent by weight of a second additional component based on the total weight of the resin composition.

For example, in one embodiment, the additional component is a plasticizer present in an amount of about 0.25 percent to about 2 percent by weight of the resin composition. In another embodiment, the resin composition includes about 70 percent to about 98 percent by weight of the base resin, about 2 percent to about 30 percent by weight of the antimicrobial additive, and about 0.5 percent to about 1 percent by weight of the plasticizer based on the total weight of the resin composition.

In another embodiment, the additional component is a UV stabilizer present in an amount of about 0.25 percent to about 5 percent by weight based on the total weight of the resin composition. In another embodiment, the resin composition includes about 80 percent to about 98 percent by weight of the base resin, about 1 percent to about 20 percent by weight of the antimicrobial additive, and about 0.5 percent to about 3 percent by weight of the UV stabilizer based on the total weight of the resin composition. In yet another embodiment, the resin composition includes about 90 percent to about 98 percent by weight of the base resin, about 1 percent to about 15 percent by weight of the antimicrobial additive, and about 0.5 percent to about 2 percent by weight of the UV stabilizer based on the total weight of the resin composition.

In yet another embodiment, the additional component is an antioxidant present in an amount of about 0.25 percent to about 5 percent by weight based on the total weight of the resin composition. In another embodiment, the resin composition includes about 80 percent to about 98 percent by weight of the base resin, about 1 percent to about 20 percent by weight of the antimicrobial additive, and about 0.5 percent to about 3 percent by weight of the antioxidant based on the total weight of the resin composition. In yet another embodiment, the resin composition includes about 90 percent to about 98 percent by weight of the base resin, about 1 percent to about 15 percent by weight of the antimicrobial additive, and about 0.5 percent to about 2 percent by weight of the antioxidant based on the total weight of the resin composition.

In still another embodiment, the resin composition includes at least two additional components, each present in an amount of about 1 percent to about 5 percent by weight based on the total weight of the resin composition. For example, each of the first and second additional components may be present in an amount of about 1 percent to about 3 percent by weight based on the total weight of the resin composition. In one embodiment, the resin composition includes about 80 percent to about 98 percent by weight of the base resin, about 1 percent to about 20 percent by weight of the antimicrobial additive, and about 1 percent to about 3 percent by weight of each of the additional components based on the total weight of the resin composition. In another embodiment, the resin composition includes about 90 percent to about 98 percent by weight of the base resin, about 1 percent to about 15 percent by weight of the antimicrobial additive, and about 1 percent to about 2 percent by weight of each of the additional components based on the total weight of the resin composition.

Methods of Making

The resin composition may be prepared by a typical method known in the art. In one embodiment, the resin may be prepared in pellet form by feeding the base resin and the antimicrobial additive (and, optionally, at least one additional component) into a single-screw extruder or a twin-screw extruder. In this aspect, the resin composition may be prepared in pellet form by extruding the mixture of the base resin and the antimicrobial additive using cylinder temperatures of about 400° F. to about 600° F. using a twin screw extruder. In one embodiment, the processing temperature is about 500° F. to about 600° F. In another embodiment, the processing temperature is about 400° F. to about 575° F. In still another embodiment, the processing temperature is about 500° F. to about 600° F.

In another embodiment, the resin composition may be prepared as a masterbatch to later be fed through a side feeder of the extruder to be extruded with base resin pellets. In this aspect, the total amount of antimicrobial additive in the masterbatch is at least 0.5 percent (w/w) relative to the total weight of the masterbatch. In one embodiment, the total amount of antimicrobial additive may be up to 50 percent (w/w) relative to the total weight of the masterbatch. In another embodiment, the resin composition is prepared as a 1 percent to 25 percent masterbatch. In yet another embodiment, the resin composition is prepared as a 1 percent to 15 percent masterbatch. For example, the master batch may include 5-15 lbs of antimicrobial additive and 85-95 lbs of base resin. In still another embodiment, the resin composition is prepared as a 5 percent to 10 percent masterbatch. For example, the master batch may include 5-10 lbs of antimicrobial additive and 90-95 lbs of base resin. In yet another embodiment, the resin composition is prepared as a 1 percent to 2 percent masterbatch.

In this aspect, the let-down temperature may range from about 2.5 percent to about 15 percent of the processing temperature. In one embodiment, the let-down temperature is about 2.5 percent to about 10 percent of the processing temperature.

In one embodiment, the compounding may be performed at relatively cold temperatures compared to normal processing temperatures for polycarbonate or similar resins. For example, the various zones of an extruder may be run at the following temperature ranges:

TABLE 1

Processing Temperatures

| Zone | Temperature (° F.) |
|---|---|
| 1 | 290-315 |
| 2 | 350-400 |
| 3 | 175-200 |
| 4 | 175-200 |
| 5 | 275-375 |
| 6 | 275-375 |

Another advantage of the antimicrobial additive in the context of the extrusion method is that it acts like a plasticizer or processing aid. In particular, the process of making the resin composition may be done more quickly and at a lower temperature than what would be required for a resin composition that did not include the antimicrobial additive of the present invention.

In another embodiment, the resin composition may be formed via mixing at or close to room temperature using any of the porous carrier resins discussed above. This method is particularly beneficial for use with thermally sensitive antimicrobial additives. In this aspect, the antimicrobial additive, suspended in methanol, and one of the porous carrier resins discussed above may be added to a Henschel (or comparable) mixer. In one embodiment, the maximum additive loading may be realized within about 15 minutes to about 24 hours. In another embodiment, the maximum additive loading occurs within about 15 minutes to about 10 hours. In still another embodiment, the maximum additive loading occurs within about 15 minutes to about 5 hours. For example, the maximum additive loading may occur within about 1 hour or less. In particular, the maximum additive loading may occur within 15 minutes to an hour.

The resulting resin composition has a refractive index (as measured in accordance with ASTM D542) of about 1.7 or less. In one embodiment, the refractive index of the resin composition is about 1.65 or less. In another embodiment, the resin composition has a refractive index of about 1.6 or less. In yet another embodiment, the refractive index of the resin composition is about 1.4 to about 1.6. In still another embodiment, the resin composition has a refractive index of about 1.5 to about 1.6.

In one aspect, the resulting resin composition has about 3 to about 6 weight percent of volatiles and semi-volatiles, about 72 to about 80 weight percent of non-volatiles, and about 16 to about 20 weight percent solid residue (per TGA analysis). In another embodiment, the resulting resin composition has about 4 to about 5 weight percent of volatiles and semi-volatiles, about 74 to about 78 weight percent of non-volatiles, and about 18 to about 20 weight percent solid residue.

The degradation temperature of the resulting resin composition is about 500° F. to about 650° F. (per TGA analysis). In one embodiment, the degradation temperature of the resulting resin composition ranges from about 550° F. to about 640° F. In another embodiment, the resulting resin composition has a degradation temperature of about 575° F. to about 630° F. In still another embodiment, the degradation temperature of the resulting resin composition is greater than about 600° F. and, more specifically, about 610° F. to about 630° F.

The light transmission of the resulting resin composition is about 80 percent to about 100 percent when measured in accordance with ASTM D1003. In one embodiment, the resin composition has a light transmission of about 82 percent to about 100 percent. In another embodiment, the resin composition has a light transmission of about 85 percent to about 100 percent. In still another embodiment, the light transmission of the resin composition is at least about 88 percent. For example, the light transmission of the resin composition may be about 88 percent to about 92 percent.

The haze (as measured in accordance with ASTM D1003) of the resin composition may be about 2 percent or less. In one embodiment, the haze of the resin composition is about 1.5 percent or less. In another embodiment, the resin composition has a haze of about 1 percent of less. In still another embodiment, the haze of the resin composition may be about 0.8 percent or less.

The resulting resin composition may have similar impact, tensile, and flexural properties as the base resin. In this aspect, the resin composition may have an izod impact of from about 1 to about 1200 J/m when measured in accordance with ASTM D 256 (i.e., the izod impact, notched, 23° C.) or from about 10 to about 200 kJ/m$^2$ when measured in accordance with ISO 180/1A. In one embodiment, the izod impact of the resin composition is about 500 to about 1100 J/m when measured in accordance with ASTM D 256 and/or about 20 to about 100 kJ/m$^2$ when measured in accordance with ISO 180/1A. The Charpy impact (notched, 23° C.) of the resin composition measured in accordance with ISO 179 may range from 2 to 50 kJ/m$^2$.

The tensile strength of the resin composition may be from about 45 to about 75 MPa (about 7000 to about 11,000 psi) when measured in accordance with ASTM D 638. In one embodiment, the tensile strength of the resin composition is about 55 to about 68 MPa (about 8000 to about 10000 psi) when measured in accordance with ASTM D 638.

The flexural strength of the resin composition may range from about 60 to about 140 MPa (about 9000 psi to about 20,000 psi) when measured in accordance with ASTM D 790. In one embodiment, the flexural strength of the resin composition ranges from about 80 to about 100 MPa when measured in accordance with ASTM D 790.

The flexural modulus of the resin composition may range from about 2000 to about 3000 MPa when measured in accordance with ASTM D 790. In one embodiment, the flexural modulus of the resin composition may range from about 2100 MPa to about 2400 MPa when measured in accordance with ASTM D 790. In another embodiment, the flexural modulus of the resin composition ranges from about 2200 to about 2375 MPa (ASTM D 790).

The melt flow rate of the resin composition may be from about 2 to about 15 g/10 min (measured in accordance with ASTM D 1238). For example, the melt flow rate of the resin composition may be about 8 to about 12 g/10 min (measured in accordance with ASTM D 1238). In another embodiment, the resin composition has a melt flow rate of about 3 to about 8 g/10 min (measured in accordance with ASTM D 1238). In still another embodiment, the resin composition has a melt flow rate of about 3 to about 11 g/10 min (measured in accordance with ASTM D 1238).

In addition, the resulting resin composition is effective against a host of bacteria including *Escherichia coli* and *Staphylococcus aureus*. In one embodiment, the resin composition is bacteriostatic and bactericidal. In particular, the zone of inhibition may be at least 3 mm. In another embodiment, the zone of inhibition is at least 6 mm. In another embodiment, the zone of inhibition is at least 8 mm. In still another embodiment, the zone of inhibition is at least 10 mm. In still another embodiment, the zone of inhibition is at least 13 mm. For example, the resin composition of the invention, once formed into a press, may have a zone of inhibition for *E. coli* of about 10 mm to about 14 mm. Similarly, the resin composition of the invention, when formed into an article may have a zone of inhibition for *S. aureus* of about 3 mm to about 8 mm. The average width of a zone of inhibition may be calculated as follows:

$$W=(T-D)/2$$

where:
W=width of clear zone of inhibition in mm.
T=total diameter of test specimen and clear zone in mm.
D=diameter of the test specimen in mm.

Molded articles produced from the resin compositions of the invention may be produced by injection molding, blow molding, extrusion molding, casting molding, or the like. For example, face shields and safety goggles may be made from the resin compositions of the invention. In addition, protective shields such as cash register enclosures can be thermoformed from the resin compositions of the invention. Moreover, pneumatic tubes (such as for use in a bank setting) may be formed from the resin compositions of the invention.

EXAMPLES

The following non-limiting examples are merely illustrative of the preferred embodiments of the present invention, and are not to be construed as limiting the invention, the scope of which is defined by the appended claims.

Example 1: Resin Composition

A resin composition contained polycarbonate together with an antimicrobial additive was prepared in order to investigate the antimicrobial effectiveness of the resin composition.

The following components were used to form the test sample:
Base resin: Lexan 121R from Sabic, 95 weight percent
Antimicrobial additive: Chlorhexidine acetate, 5 weight percent Control samples were also prepared with the base resin only, i.e., no antimicrobial additive.

The experiment was executed as follows:
The base resin and antimicrobial additive were fed into a twin-screw extruder and extruded. The resulting pellets were then aseptically cut into 25×50 mm strips for testing.

Plate Count Agar (PCA) was inoculated with a 24-hour culture of *Escherichia coli* ATCC 25922 and *Staphylococcus aureus* ATCC 6538. Using a 10 ul loop, 5 streaks approximately 60 mm long and 4 mm wide were placed 10 mm apart on the agar. All 5 streaks were plated using a single loop without re-inoculating into the culture. The test samples and positive controls were then placed on the agar so that they were overlapping and perpendicular to the streaks. The inoculated plates were then inverted and incubated under conditions favorable for growth. More specifically, the incubation time and conditions were 33-35° C. for 18-24 hours.

The entire diameter of the inhibitory zone is measured in millimeters on the underside of the plate. It is then subtracted by the width of the test strip, and divided by 2. If the polymer product is effective as an antimicrobial, a clear zone of no growth (the zone of inhibition) is seen around the sample. The following equation was used to calculate the average width of a zone of inhibition.

$$W=(T-D)/2$$

where:
W=width of clear zone of inhibition in mm.
T=total diameter of test specimen and clear zone in mm.
D=diameter of the test specimen in mm.
The results are shown in Table 2 below:

TABLE 2

| | Inhibition Testing | |
| --- | --- | --- |
| | Average Zone of Inhibition (mm) | |
| | *Escherichia coli* ATCC | *Staphylococcus aureus* ATCC 6538 |
| Test Sample | 13.5 | 4.5 |
| Control | <1 | <1 |

Example 2: Masterbatch

A 5% masterbatch is formed using 95 lbs of base resin (Lexan 121R from Sabic) and 5 lbs of chlorhexidine acetate. The components were mixed in a Henshall mixer using at a low sheer screw speed so as not to activate the additive. The mixture was then compounded using a 30 mm Werner & Pfleider twin screw extruder.

Feeding 1 percent of the 5% masterbatch through a side feeder produces 500 ppm of antimicrobial additive in the resulting pellets.

Example 3: Mixing Method

A porous polymer carrier based on polycarbonate and an antimicrobial additive are mixed at room temperature to produce antimicrobial impregnated resin pellets. ACCUREL® XP601 is dried overnight in methanol. Chlorhexidine gluconate and the dried ACCUREL® XP601 is added to a Henschel mixer at room temperature. Maximum additive loading by physical absorption is realized within 1 hour.

Example 4: TGA Analysis

Samples from the masterbatch of Example 2 were subjected to thermogravimetric analysis. More specifically, approximately 25 mg of each sample was analyzed on a TA Instruments Q50 TGA with the following profile: heating ramp of 2° C./min from 25° C. to 650° C. under nitrogen followed by an air switch and heating at 2° C./min from 650° C. to 950° C.

The thermogravimetric profiles between 20° C.-950° C. for the samples are provided in FIG. 1. The components of the products are divided into volatile, semi-volatile, non-volatile, and inorganic components based on temperature ranges. Volatile components are those compounds that boil between room temperature and 110° C., semi-volatile components boil between 110° C. and 350° C., non-volatile components boil between 350° C. and 650° C., and inorganic components are materials that remain at high temperature in the presence of atmosphere. Table 3 below shows the approximate weight percentages of the sample:

TABLE 3

| Weight Percentages of Masterbatch Samples | |
| --- | --- |
| Component | Weight Percent |
| Volatiles & Semi-Volatiles | 4.22 |
| Non-Volatiles | 76.26 |
| Solid Residue | 19.52 |

Although the present invention has been described with reference to particular embodiments, it will be understood to those skilled in the art that the invention is capable of a variety of alternative embodiments within the spirit of the appended claims.

What is claimed is:

1. A resin composition comprising:
   a base resin comprising polycarbonate; and
   an additive having a decomposition temperature of about 450° F. or greater, wherein the additive is effective against Gram-positive bacteria and Gram-negative bacteria, and
   wherein the additive comprises chlorhexidine, chlorhexidine gluconate, or chlorhexidine acetate,
   wherein the base resin and the resin composition have a refractive index of about 1.4 to about 1.6, and
   wherein the resin composition is both bacteriostatic and bactericidal.

2. The resin composition of claim 1, wherein the base resin and the resin composition have a refractive index of about 1.5 to about 1.6.

3. The resin composition of claim 1, wherein the additive has a decomposition temperature of about 490° F. to about 550° F.

4. The resin composition of claim 1, wherein the additive can kill about 95 percent or more of Gram-positive and Gram-negative bacteria within 1 minute or less.

5. The resin composition of claim 4, wherein the additive can kill about 99 percent or more of Gram-positive and Gram-negative bacteria within 30 seconds or less.

6. The resin composition of claim 1, wherein the difference between the refractive index of the base resin and the resin composition is less than about 0.1.

7. The resin composition of claim 1, further comprising at least one additional component selected from the group consisting of a heat stabilizer, an antioxidant, a UV stabilizer, and mixtures thereof.

8. The resin composition of claim 7, wherein the base resin is included in an amount of about 80 to about 98 weight percent, the antimicrobial additive is included in an amount of about 1 to about 20 weight percent, and the additional component is included in an amount of about 0.5 to about 3 weight percent based on the total weight of the resin composition.

9. The resin composition of claim 7, wherein the additional component is included in an amount of about 1 to about 5 weight percent based on the total weight of the resin composition.

10. A resin composition comprising:
    abase resin comprising polycarbonate, polypropylene, poly(ethyleneterephthalate), glycol modified poly(ethyleneterephthalate), or glycol modified poly-cyclohexylenedimethylene terephthalate; and an additive having a decomposition temperature of about 500° F. or greater, wherein the additive is effective against Gram-positive bacteria, Gram-negative bacteria, fungi, or combinations thereof, and wherein the additive comprises chlorhexidine, chlorhexidine gluconate, or chlorhexidine acetate;

wherein the base resin and the resin composition have a light transmission of at least about 88 percent, and wherein the resin composition is bacteriostatic and bactericidal.

11. The resin composition of claim 10, wherein the base resin comprises a branched chain polycarbonate.

12. The resin composition of claim 10, wherein the resin composition has a haze of about 1 percent or less.

13. The resin composition of claim 10, wherein the difference between the light transmission of the base resin and the resin composition is about 2 percent or less.

14. The resin composition of claim 10, further comprising at least one additional component selected from the group consisting of a heat stabilizer, an antioxidant, a UV stabilizer, and mixtures thereof.

15. A masterbatch comprising:
about 80 to about 98 weight percent polycarbonate based on the total weight of the masterbatch;
about 1 to about 20 weight percent of an additive effective against Gram-positive bacteria and Gram-negative bacteria based on the total weight of the masterbatch, and wherein the additive comprises chlorhexidine, chlorhexidine gluconate, or chlorhexidine acetate; and
about 0.5 to about 5 weight percent of at least one additional component selected from the group consisting of a heat stabilizer, an antioxidant, a UV stabilizer, and a combinations thereof.

16. The masterbatch of claim 15, wherein the additive is chlorhexidine gluconate or chlorhexidine acetate.

17. The masterbatch of claim 15, wherein the additive is present in an amount of about 2 to about 15 weight percent based on the total weight of the masterbatch.

18. The masterbatch of claim 17, wherein the polycarbonate is present in an amount of about 90 to about 97 weight percent based on the total weight of the masterbatch.

19. The masterbatch of claim 18, wherein the at least one additional component is present in an amount of about 1 to about 3 weight percent based on the total weight of the masterbatch.

20. The masterbatch of claim 15, wherein the masterbatch is both bacteriostatic and bactericidal.

* * * * *